G. JANEK.
BURGLAR ALARM.
APPLICATION FILED APR. 24, 1912.
1,066,907.
Patented July 8, 1913.
5 SHEETS—SHEET 4.
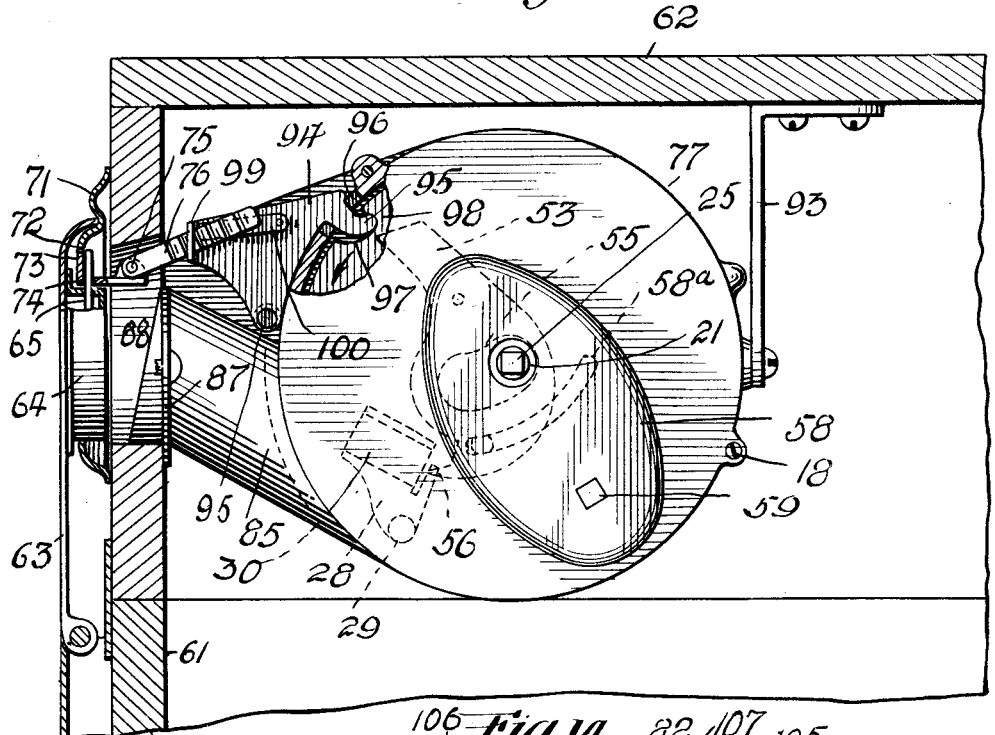
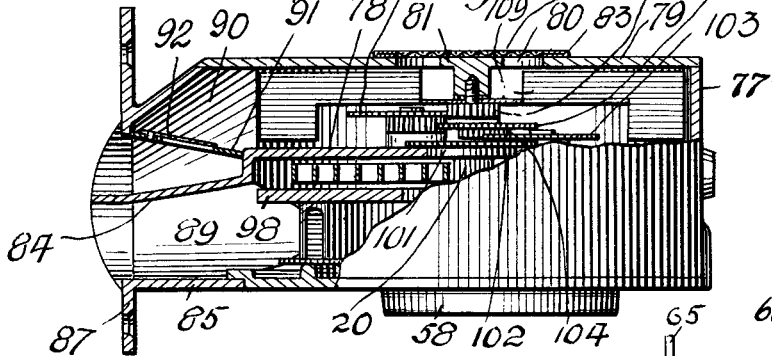
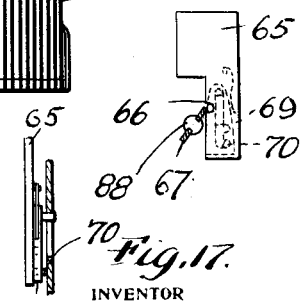
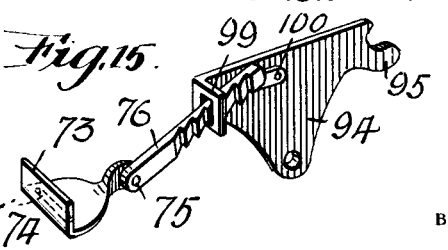
WITNESSES
Samuel Payne
Ralph C. Evert
INVENTOR
G. Janek.
BY
ATTORNEYS

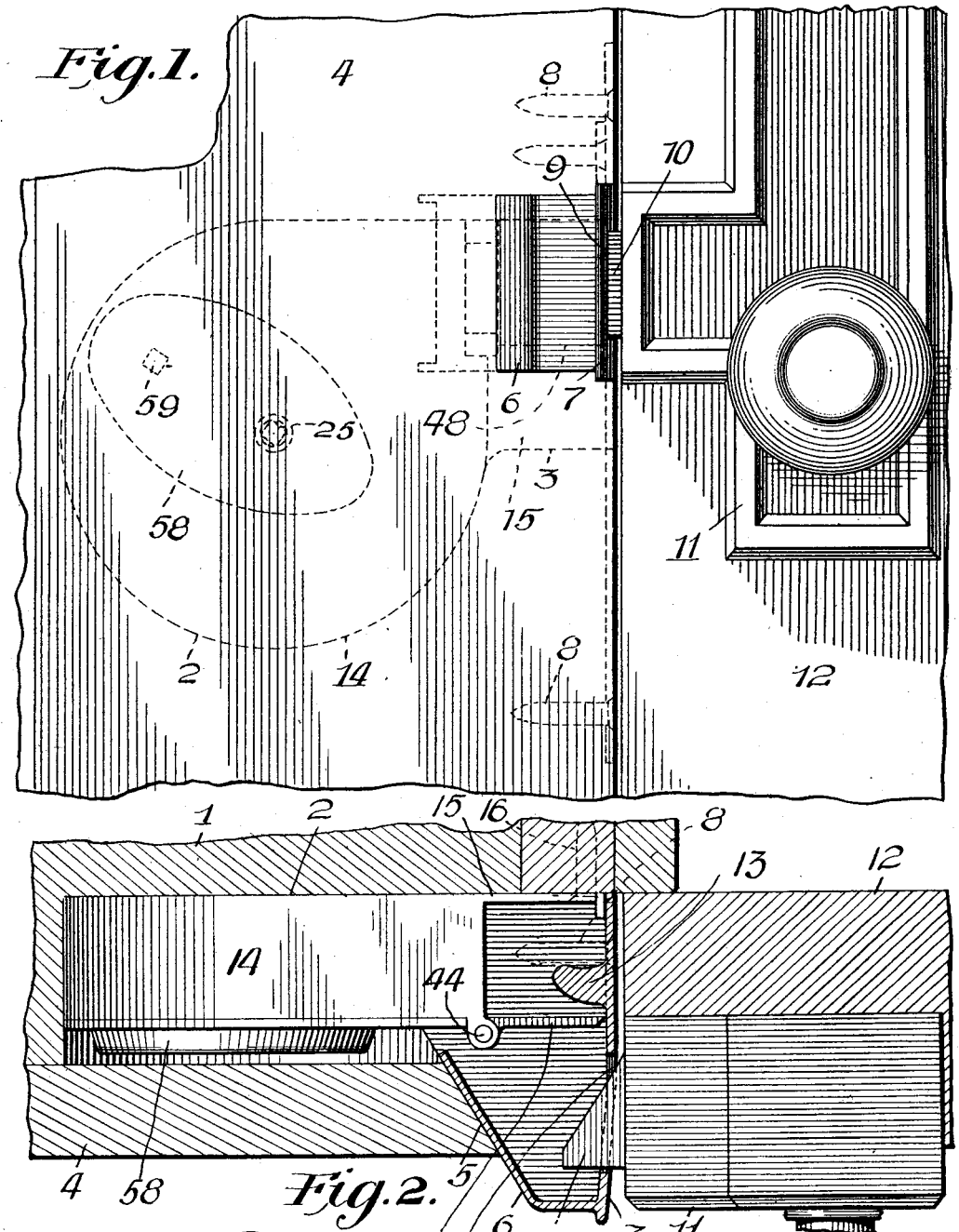

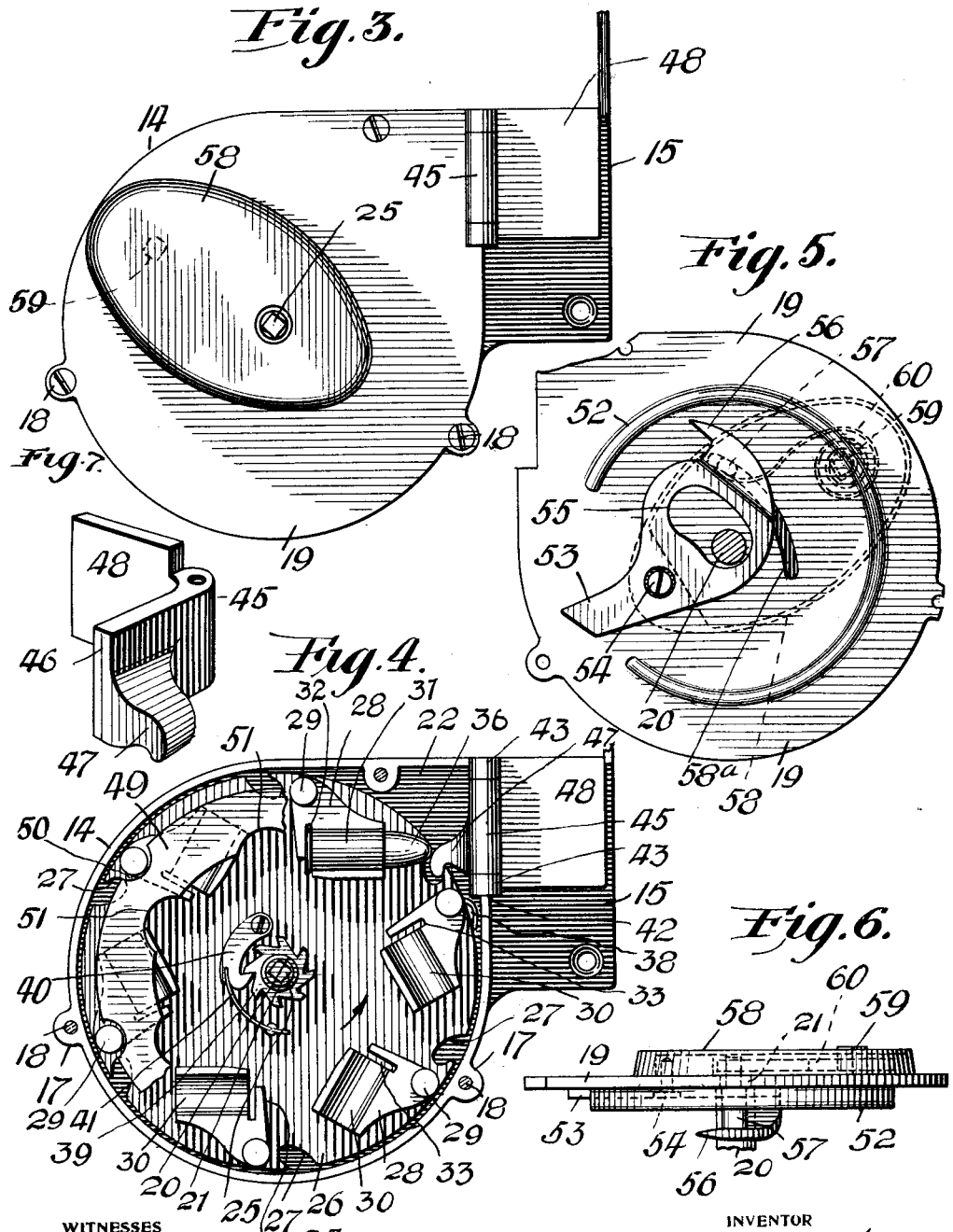

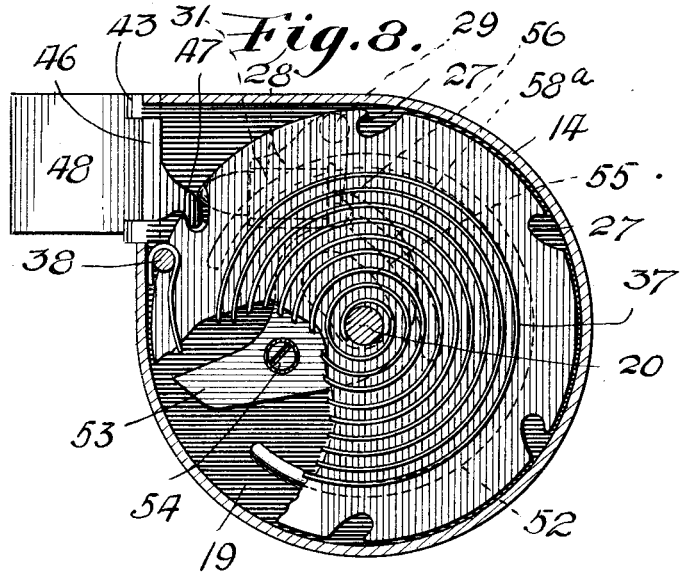
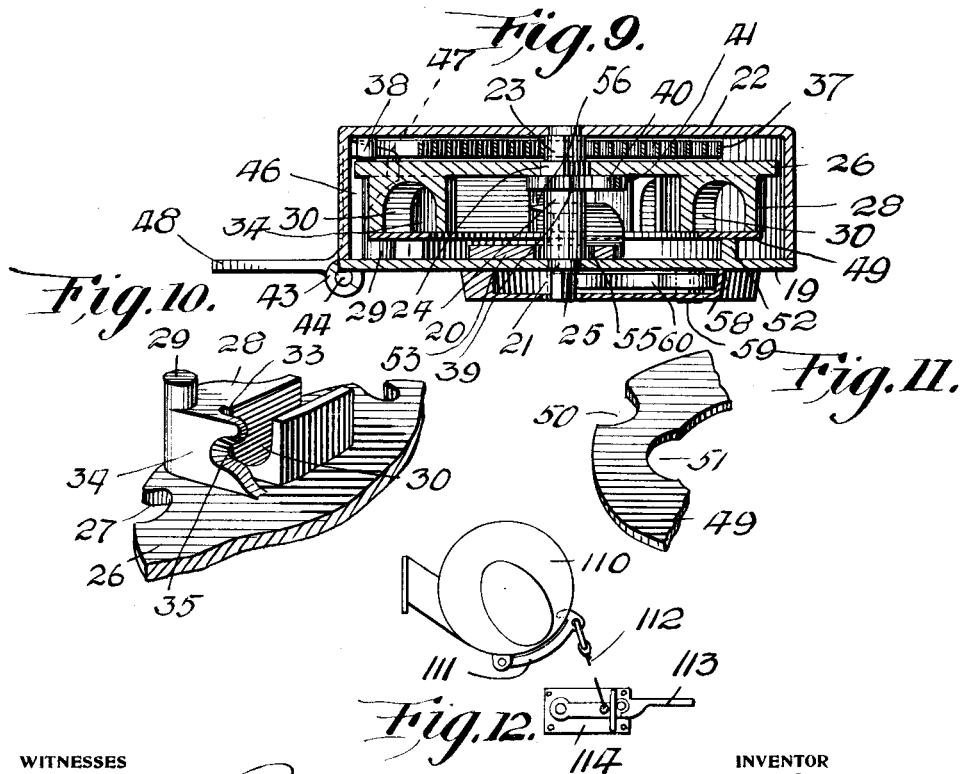

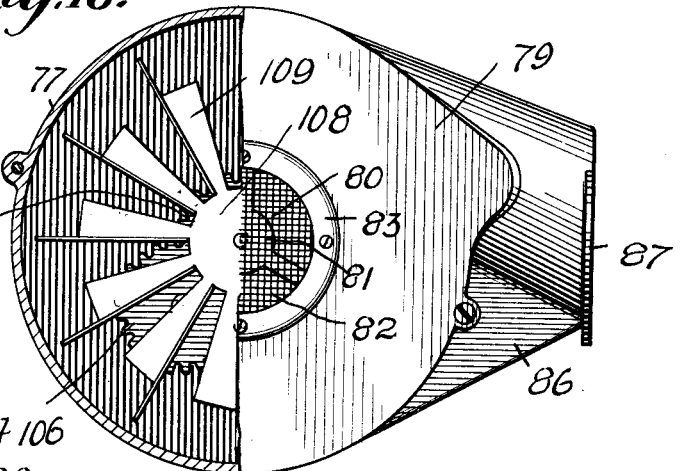
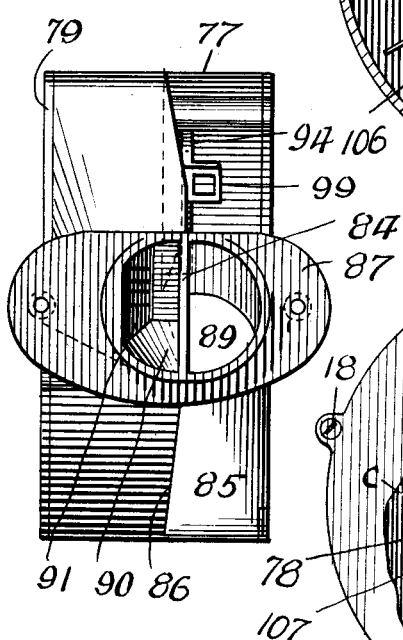
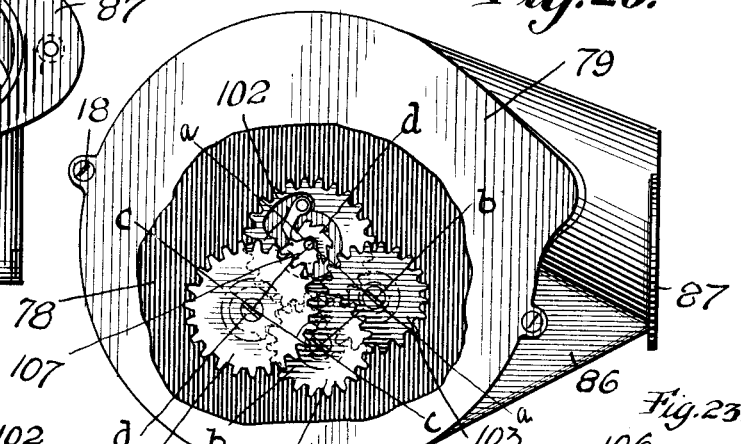
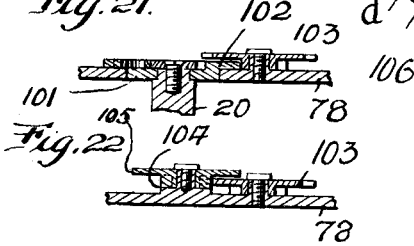
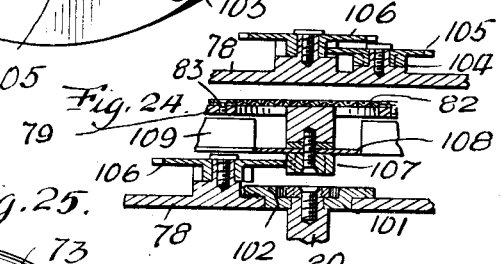
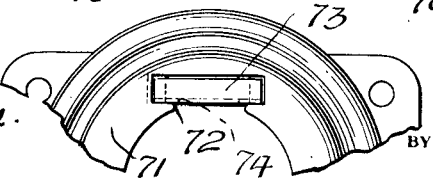

UNITED STATES PATENT OFFICE.

GEZA JANEK, OF NEW YORK, N. Y.

BURGLAR-ALARM.

1,066,907.   Specification of Letters Patent.   Patented July 8, 1913.

Application filed April 24, 1912. Serial No. 692,909.

*To all whom it may concern:*

Be it known that I, GEZA JANEK, a subject of the King of Hungary, residing at New York, in the county of New York and State of New York, have invented certain new and useful Improvements in Burglar-Alarms, of which the following is a specification, reference being had therein to the accompanying drawing.

This invention relates to burglar alarms, and my invention aims to provide:—first, an alarm mechanism that can be located in a door frame to sound an alarm when an attempt is made by burglars to pry or otherwise open the door of the door frame. Second, an alarm mechanism wherein blank cartridges or a whistle are employed for sounding an alarm that will scare a burglar and notify the occupants of a building that the doors thereof have been tampered with. Third, a burglar alarm embodying a spring actuated cartridge carrier that is released when the lock of a door is tampered with, the alarm producing a series of detonations imitating rapidly fired shots from a revolver. Fourth, a burglar alarm mechanism that is durable, easy to install and highly efficient for the purposes for which it is intended.

With the above and other objects in view, the invention resides in the novel construction, combination and arrangement of parts to be hereinafter specifically described and then claimed.

Reference will now be had to the drawings wherein there are illustrated the preferred embodiments of my invention, but it is to be understood that the structural elements thereof are susceptible to such variations and modifications as fall within the scope of the appended claims.

In the drawings: Figure 1 is a front elevation of a portion of a door frame and door provided with the burglar alarm, Fig. 2 is a horizontal sectional view of the same showing the alarm mechanism in plan, Fig. 3 is a front elevation of the alarm mechanism as detached from the door frame, Fig. 4 is a front elevation of the same with the cover plate removed, Fig. 5 is an elevation of a detached cover plate, illustrating the trigger mechanism, Fig. 6 is a plan of the same, Fig. 7 is a perspective view of a detached detent, Fig. 8 is a longitudinal sectional view of the alarm mechanism, Fig. 9 is a horizontal sectional view of the same, Fig. 10 is a perspective view of a portion of the spring actuated carrier showing one of the cartridge holders, Fig. 11 is a perspective view of the retaining ring, Fig. 12 is a side elevation of a modification of the invention especially designed for use in connection with counters, Fig. 13 is a similar view of a further modification of the invention especially designed for use in connection with trunks or other inclosures, Fig. 14 is a plan of the device illustrated in Fig. 13, the casing being partly broken away and partly in section, Fig. 15 is a perspective view of a detent and latch keeper forming part of the device illustrated in Fig. 13, Figs. 16 and 17 are details of portions of a lock latch for the trunk shown in Fig. 13, Fig. 18 is an elevation of the casing illustrated in Fig. 14, said casing being partly broken away and partly in section, Fig. 19 is a front elevation of the same, Fig. 20 is a front elevation of the casing partly broken away and partly in section, Fig. 21 is a cross sectional view of the same taken on the line *a—a* of Fig. 20, Fig. 22 is a similar view taken on the line *b—b* of Fig. 20, Fig. 23 is a similar view taken on the line *c—c* of Fig. 20, Fig. 24 is a similar view taken on the line *d—d* of Fig. 20, and Fig. 25 is an enlarged front elevation of a portion of the keeper carried by the trunk lid.

Describing the invention in detail with reference to the drawings, like numerals denote corresponding parts throughout: 1 denoting a door frame that has a mortise or recess 2. The recess 2 is circular and has an outlet opening 3 at the side of the frame 1. The recess 2 is closed by a permanent face board 4 and this board is cut away, as at 5 to accommodate a casing 6, carried by a strike plate 7. The strike plate 7 is secured to the side of the frame 1 by screws 8 or other fastening means and is of a length to project above and below the opening 3.

The strike plate 7 has an opening 9 for a latch 10 of a door lock 11, carried by a door 12. The strike plate 7 also has an inwardly projecting integral kick-off member 13 that extends into the casing 6 and the strike plate 7.

14 denotes a circular casing that is arranged within the recess 2. The casing 14 has an extension 15 extending into the opening 3 and secured to the door frame 1 by screws 16 or other fastening means. The front side of the casing 14 has apertured lugs 17 and connected to these lugs by screws 18 or other fastening means is a cover plate 19.

20 denotes a winding arbor arranged concentrically of the casing 14 and having cylindrical portions 21 that are journaled in the rear wall 22 of the casing 14 and in the cover plate 19. The winding arbor has rectangular portions 23 and 24, also a rectangular shank 25 that protrudes from the cover plate 19.

26 denotes a circular carrier that is mounted upon the rectangular portion 24 of the winding arbor 20. The periphery of this carrier has equally spaced slots 27 and adjacent to each slot is a cartridge holder 28, each holder having a bearing pin 29 extending toward the cover plate 9, as best shown in Fig. 9, said pin preventing the carrier 26 from shifting longitudinally upon the winding arbor 20. Each cartridge holder has a socket 30 for a cartridge 31 and the head 32 of the cartridge extends into a space 33 provided therefor at one end of the holder 28. The head 32 of the cartridge also engages an end plate 34 that is cut away and beveled, as at 35 to provide clearance for a firing pin to be hereinafter described. As illustrated in Fig. 4, the cartridges 31 can be provided with bullets 36, although blank cartridges can be employed.

37 denotes a coiled spiral spring having one end thereof attached to the rectangular portion 23 of the winding arbor 20, said spring being arranged between the rear wall 22 of the casing 19 and the rear sides of the carrier 26. The opposite end of the spring 37 is connected to a pin 38, carried by the rear wall 22 of the casing 19.

39 denotes a ratchet wheel mounted upon the winding arbor 20, adjacent to the rectangular portion 24 of said winding arbor. Engaging the ratchet wheel 39 is a pivoted pawl 40, pivotally connected to the carrier 26. The pawl 40 is retained in engagement with the ratchet wheel 39 by a flat compression spring 41 secured to the carrier 26.

42 denotes an opening in the casing 14 at the extension 15 thereof, and at the upper and lower ends of the opening 42 there are barrels 43 for a pivot pin 44. The pivot pin 44 extends through a barrel 45, carried by a detent 46. The detent 46 has a tooth 47 that engages in one of the slots 27 of the carrier 26 and holds said carrier against rotation. The detent 46 has a projection 48 that is in close proximity to the kick-off member 13 of the strike plate 7. The projection 48 is engaged by the kick-off member 13 to shift the detent and move the tooth 47 thereof out of the slots 27, as will hereinafter appear.

49 denotes a retaining ring that is arranged upon the cartridge holders 28 of the carrier 26. The retaining ring 49 is cut away, as at 50 to provide clearance for the pins 29 and cut away, as at 51 to provide clearance for the cartridges 31 arranged in the holders 28.

52 denotes an annular rib carried by the inner side of the cover plate 19, said rib engaging the retaining ring 49 and holding the same against the cartridge holders 28 of the carrier 26.

53 denotes a trigger that is pivotally mounted upon a screw 54 arranged in the cover plate 19. The rib 52 is cut away to provide clearance for the trigger 53, and said trigger is slotted, as at 55 to provide clearance for the winding arbor 20. The trigger 53 has an offset firing pin 56 and said pin is provided with a stud 57 that extends through a segment-shaped slot 58ª provided therefor in the cover plate 19. The stud 57 extends into an oval casing 58 arranged upon the outer side of the cover plate 19 and retained in engagement therewith by the screw 54, also by a screw 59.

60 denotes a spiral spring that has one end thereof attached to the screw 59, within the casing 58, and the opposite end thereof engaging the stud 57.

Before considering the modifications of my invention, it is thought best to describe the operation of the preferred form of device. As set forth in the objects of my invention it will be remembered that the alarm is designed to operate when a burglar attempts to pry open the door 12. To throw open the door, a burglar generally removes the strike plate 7 and when doing so the kick-off member 13 engages the projection 48 of the detent, shifting said detent whereby the tooth 47 is removed from the slots 27 of the carrier 26, and this carrier can then revolve. The carrier 26 is revolved in the direction of the arrow of Fig. 4, and this is accomplished by the tension of the spring 37 being released. As the carrier 26 revolves, the cartridge holder 28 successively engages the trigger 53 shifting the same thereby placing the spring 60 under tension by reason of the stud 57 engaging one end of the spring. When a cartridge holder 28 passes clear of the trigger, the latter is released and the firing pin 56 of the trigger then strikes the head of a cartridge with sufficient force to fire the same. The holder containing the fired cartridge shifts the trigger again, releases it and allows the trigger to fire the cartridge in the next succeeding cartridge holder. This operation of successively cocking or setting the trigger and the firing of the cartridges is carried on until all of the cartridges within the cartridge holders are fired, such firing being similar to a repeating gun or revolver. After the alarm has been used, the screws 16 can be removed and the casing 14 withdrawn from the recess 2. The cover plate 19 can then be removed, and the fired cartridges replaced by new cartridges. After the cover plate 19 has been replaced, a key or other instrument, (not shown) can be placed upon the shank 25 of the winding arbor 20 and the arbor rotated until the spring 37 is again placed under tension. The shank 25 extends through an opening provided therefor in the casing 28, and the detent 46 can be easily set to hold the carrier 26 and the spring 27 under tension.

Reference will now be had to Figs. 13 to 25 inclusive, illustrating a modification of my invention that has been especially designed for a trunk or other inclosure having a hinged lid. The alarm in this instance, besides possessing means for causing successive detonations, has means for producing a whistle or the sound of a siren, which will immediately notify a person in the vicinity of the trunk that the same has been tampered with. First referring to Fig. 13, the reference numeral 61 denotes a portion of a trunk having a hinged lid 62. The trunk 61 has a pivoted hasp 63 provided with a lock 64 in which is located a latch 65. The latch 65 has a nut 66 for the bit 67 of a key 68. The bit 67 is also adapted to engage a member 69, pivotally supported by the latch 65. The member 69 is engaged by a pin 70, carried by the lock casing 64, and when said member is shifted by the bit of the key, the latch 65 can be lowered. 71 denotes a keeper plate secured to the lid 62 of the trunk and said keeper plate has a slot 72 providing clearance for a pivoted latch keeper 73, said latch keeper having a slot 74 formed therein for the latch 65. The latch keeper 73, is pivotally connected, as at 75 to a rack 76, the object of which will presently appear. 77 denotes a casing that is arranged within the lid 62 of the trunk. The casing 77 is similar to the casing of the preferred form of construction, with the exception that the casing 77 is divided into two parts separated by a partition 78 that corresponds to the rear wall 22 of the casing 14. The casing 77 has a detachable rear wall 79 provided with a central opening 80 having a spider 81. Arranged over the opening 80 at the outer side of the rear wall 79, is a screen 82 held by a frame 83, said screen preventing dirt and foreign matter from entering the compartment in the rear part of the casing 77. The partition 78 is extended, as at 84 into a tangentially disposed chute 85 that is braced relatively to the casing 77 by a web 86. The end of the chute 85 has a face plate or apertured lug 87 that is secured to the inner side of the lid 62, whereby the chute will be in communication with an opening 88 provided therefor in the lid 62, said opening also accommodating the latch keeper 73 and the pivoted end of the rack 76. The chute 85 is also divided into two compartments, and the compartment which I have designated 89 provides clearance for bullets that are discharged from the cartridge holders 28 previously described, although as heretofore explained it is not necessary to use bullets in connection with the cartridges 31. Besides the compartment 89 in the chute 85, there is a compartment 90 and arranged transversely of said compartment is a reed holder 91 for a reed 92. This reed is adapted to produce sounds when air is blown through the compartment 90. 93 denotes a support coöperating with the base plate 87 in holding the casing 77 within the lid 62 of the trunk, and by reference to Fig. 13, it will be observed that the casing 77 is positioned at a different angle from the casing 14, in order that when the spring wound carrier is released, the bullets of the cartridges will be discharged through the compartments 89 of the chute 85, and in a direction to strike a person in front of the trunk lid 62. 94 denotes a detent that is pivotally connected, as at 95 to the web 86. The detent 94 has a tooth 95 extending through an opening 96 provided therefor in the casing 77. The tooth 95 engages in one of a series of flaps 97 provided therefor in a carrier 98 corresponding to the carrier 26 of the preferred form of construction. The detent 94 has a slotted extension 99 at one end thereof for the rack 76, said rack engaging the slotted extension in a manner that the detent will be shifted immediately upon the rack being moved outwardly relatively to the lid 62, this being accomplished when the latch keeper 73 is pried or otherwise surreptitiously moved relatively to the lid 62. The rack 76 is retained in engagement with the extension 99 by a flat compression spring 100, carried by the detent 94. 101 denotes the hook carried by the prolonged end of the winding arbor, the prolonged end of said winding arbor extending into the compartment formed between the partition 78 and the rear wall 79.

By reference to Figs. 14 and 20 to 24 inclusive, it will be observed that I resort to the use of a train of gears comprising meshing gear wheels 102 to 106 inclusive, the gear wheel 107 being carried by the hub portion 108 of a fan 109. The fan 109 is in the form of a bladed wheel made of sheet metal, and the metal cut and stamped whereby the blades of the fan or wheel will occupy the greater portion of the compartment between the partition 78 and the rear wall 79.

Without unnecessarily going into detail as to the operation of the modified form of construction just described, it will be observed that a train of gear wheels is employed for increasing the speed of the winding arbor, when the spring held carrier 98 is released, whereby the fan will be revolved at a greater rapidity than the winding arbor. In consequence of the rapid movement of the fan, a current of air is produced that causes the reed 92 to produce a noise or sound that will attract the attention of persons in the vicinity of the trap, should the cartridges fail for the purposes for which they are intended. In this modified form of construction, I have simply combined a noise or sound producing mechanism with the cartridge detonator, both of which are placed in operation when the lid 62 of the trunk is surreptitiously opened.

Reference will now be had to Fig. 12, wherein 110 denotes a casing that can contain a cartridge detonator or sound producing mechanism. The casing 110 has a detent 111 that is arranged upon the outer side of the casing 110, but engaging the carrier arranged within said casing. The detent 111 is connected by a cable 112 to a tread 113 pivotally connected to a bearing plate 114. The modification illustrated in Fig. 12 has been especially designed for use in connection with a counter, and the tread 113 is adapted to be actuated by a person behind the counter to move the detent 111 and release the carrier within the casing 110, whereby cartridges will be fired or a noise or sound produced. This type of alarm can be advantageously used in jewelry stores and in almost any store where an attempt could be made to harm a clerk or remove goods by theft.

From the foregoing it will be observed that the elements 7 and 71 are employed for practically the same purpose, consequently in referring to these elements in the claims, when the term strike plate is used, it is to be understood that the same refers to either of these said elements. Furthermore, the chute 85 and the opening 42 are outlet openings for bullets that are discharged from within the casing.

What I claim is:—

1. In a burglar alarm, a casing, a spring actuated carrier arranged within said casing, a plurality of cartridge holders secured to said carrier, a trigger arranged within said casing and successively operated by a movement of said carrier to fire cartridges arranged in the cartridge holders, a detent extending into said casing and engaging said carrier, and a strike plate provided with means adapted when the strike plate is moved, to engage and shift said detent thereby releasing the carrier.

2. A burglar alarm comprising a casing having an outlet opening, a spring actuated carrier arranged within said casing, cartridge holders secured to said carrier and adapted to contain cartridges, a spring pressed trigger arranged within said casing and adapted to be successively operated by a movement of said carrier to fire cartridges arranged in said cartridge holders, and means adjacent to the outlet opening of said casing and adapted to hold said carrier normally inactive and capable of being shifted to release said carrier.

3. A burglar alarm comprising a casing, a revoluble carrier arranged within said casing, cartridge holders carried by said carrier and adapted to contain cartridges, a trigger arranged within said casing and adapted to be successively operated by a movement of said carrier to fire cartridges arranged in said cartridge holders, means arranged within said casing for revolving said carrier, and means exteriorly of said casing and extending into said casing for holding said carrier against rotation, said means being capable of releasing said carrier.

4. A burglar alarm comprising a casing, a spring actuated carrier arranged within said casing, cartridge holders arranged circumferentially of said carrier and adapted to contain cartridges, a spring pressed trigger arranged within said casing and successively actuated by a movement of said carrier for firing cartridges arranged in said cartridge holders, a detent extending into said casing and engaging said carrier to hold said carrier against rotation, and a strike plate provided with means capable of engaging and shifting said detent when the strike plate is moved to release said carrier.

5. A burglar alarm comprising a casing, a winding arbor arranged within said casing, a revoluble carrier mounted upon said winding arbor, cartridge holders arranged circumferentially of said carrier at one side thereof and adapted to support cartridges, a spring pressed trigger arranged within said casing and adapted to be successively actuated to fire cartridges arranged within said holders, a detent extending into said casing and holding said carrier against rotation, a strike plate adapted to engage said detent and release said carrier, means within said casing and connected to said winding arbor for imparting a rotary movement thereto.

6. A burglar alarm comprising a casing, a revoluble carrier arranged within said casing, cartridge holders arranged circumferentially of said carrier at one side thereof, means confronting the same side of said carrier and adapted to be successively actuated by a movement of said carrier for firing said cartridges carried by the holders, and means extending into said casing for holding said carrier against rotation, said means being capable of releasing said carrier.

In testimony whereof I affix my signature in the presence of two witnesses.

GEZA JANEK.

Witnesses:
 MAX H. SROLOVITZ,
 HARRIET R. PURVIS.

Copies of this patent may be obtained for five cents each, by addressing the "Commissioner of Patents, Washington, D. C."